US012789142B2

(12) United States Patent
Beard et al.

(10) Patent No.: US 12,789,142 B2
(45) Date of Patent: Nov. 10, 2026

(54) MULTI-FUNCTIONAL CATALYSTS FOR THE OXIDATION OF NO, THE OXIDATION OF $NH_3$ AND THE SELECTIVE CATALYTIC REDUCTION OF NOx

(71) Applicant: BASF MOBILE EMISSIONS CATALYSTS LLC, Iselin, NJ (US)

(72) Inventors: Kevin Beard, Iselin, NJ (US); Edgar Viktor Huennekes, Hannover (DE); Jan Martin Becker, Hannover (DE); Ruediger Wolff, Nienburg/Weser (DE); Petra Cordes, Wunstorf (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 519 days.

(21) Appl. No.: 17/907,557

(22) PCT Filed: Apr. 9, 2021

(86) PCT No.: PCT/EP2021/059277
§ 371 (c)(1),
(2) Date: Sep. 28, 2022

(87) PCT Pub. No.: WO2021/204990
PCT Pub. Date: Oct. 14, 2021

(65) Prior Publication Data
US 2023/0143338 A1 May 11, 2023

(30) Foreign Application Priority Data
Apr. 9, 2020 (EP) .................................... 20168921

(51) Int. Cl.
*B01D 53/94* (2006.01)
*B01J 21/08* (2006.01)
*B01J 23/46* (2006.01)
*B01J 29/76* (2006.01)
*B01J 35/00* (2006.01)
*B01J 37/02* (2006.01)

(52) U.S. Cl.
CPC ..... *B01D 53/9463* (2013.01); *B01D 53/9418* (2013.01); *B01D 53/9436* (2013.01); *B01J 21/08* (2013.01); *B01J 23/464* (2013.01); *B01J 29/763* (2013.01); *B01J 35/19* (2024.01); *B01J 37/0246* (2013.01)

(58) Field of Classification Search
None
See application file for complete search history.

(56) References Cited

U.S. PATENT DOCUMENTS

2014/0065044 A1 3/2014 Ito
2015/0306543 A1* 10/2015 Szczepanski ............ B01J 35/56 422/177
2016/0367941 A1* 12/2016 Gilbert ............... B01D 53/9436
2018/0236402 A1 8/2018 Wang et al.
2018/0280876 A1 10/2018 Chen et al.
2018/0280877 A1 10/2018 Chen et al.
2019/0176128 A1 6/2019 Micallef et al.
2019/0283011 A1 9/2019 Chen et al.
2019/0301334 A1* 10/2019 Arulraj .................... B01J 35/19
2019/0383174 A1* 12/2019 Andersen .............. F01D 25/305

FOREIGN PATENT DOCUMENTS

JP 2018-531775 A 11/2018
JP 2020000982 * 1/2020
KR 20180114238 A 10/2018
RU 2017135504 * 4/2019
WO WO-2008036908 A2 * 3/2008 ........... B01D 53/945
WO WO-2012166833 A1 * 12/2012 ........... B01D 53/565
WO 2017153894 A1 9/2017

OTHER PUBLICATIONS

International Search Report dated Jul. 6, 2021, PCT/EP2021/059277.

* cited by examiner

*Primary Examiner* — Sheng H Davis
(74) *Attorney, Agent, or Firm* — DLA Piper LLP (US)

(57) ABSTRACT

The present invention relates to a catalyst for the oxidation of NO, for the oxidation of ammonia and for the selective catalytic reduction of NOx, comprising a substrate, a first coating comprising one or more of a vanadium oxide and a zeolitic material comprising one or more of copper and iron; and a second coating comprising a platinum group metal component supported on a non-zeolitic oxidic material, wherein the second coating further comprises a zeolitic material comprising one or more of copper and iron.

10 Claims, 5 Drawing Sheets

(a) catalyst of the present invention (b) catalyst of Comp. Example 1

MULTI-FUNCTIONAL CATALYSTS FOR THE OXIDATION OF NO, THE OXIDATION OF $NH_3$ AND THE SELECTIVE CATALYTIC REDUCTION OF NOx

This application is a national stage filing under 35 U.S.C. § 371 of International Application No. PCT/EP2021/059277, filed on Apr. 9, 2021, and claims priority to EP Application No. 20168921.3, filed Apr. 9, 2020; the disclosure of each of these applications are incorporated herein by reference in their entirety.

The present invention relates to a catalyst for the oxidation of NO, for the oxidation of ammonia and for the selective catalytic reduction of NOx, a process for preparing a catalyst for the oxidation of NO, for the oxidation of ammonia and for the selective catalytic reduction of NOx, and a use of said catalyst. The present invention further relates to an exhaust gas treatment system comprising said catalyst.

US 2018/0280876 A1 discloses a catalytic article having on a substrate a first inlet zone containing an ammonia slip catalyst (ASC) comprising a platinum group metal on a support and a first SCR catalyst and a second outlet zone comprising a diesel oxidation catalyst or a diesel exotherm catalyst. Further, US 2018/0280877 A1 discloses catalyst articles and systems for the conversion of NOx and the conversion of ammonia. The catalysts of these prior art documents are not optimized for NO oxidation and do not discuss potential reduction of nitrous oxide at the outlet of their catalytic articles and systems. Thus, there is still a need to provide improved catalysts for the oxidation of NO, for the oxidation of ammonia and for the selective catalytic reduction of NOx which exhibits great catalytic activity ($NH_3$ oxidation, NO oxidation and NOx conversion) while minimizing the nitrous oxide ($N_2O$) formation.

Therefore, it was an object of the present invention to provide a catalyst for the oxidation of NO, for the oxidation of ammonia and for the selective catalytic reduction of NOx which exhibits great catalytic activity ($NH_3$ oxidation, NO oxidation and NOx conversion) while minimizing the nitrous oxide ($N_2O$) formation. Surprisingly, it was found that the catalyst for the oxidation of NO, for the oxidation of ammonia and for the selective catalytic reduction of NOx according to the present invention permits to obtain great catalytic activity ($NH_3$ oxidation, NO oxidation and NOx conversion) while reducing the nitrous oxide ($N_2O$) formation.

Therefore, the present invention relates to a catalyst for the oxidation of NO, for the oxidation of ammonia and for the selective catalytic reduction of NOx, comprising (i) a substrate comprising an inlet end, an outlet end, a substrate axial length extending from the inlet end to the outlet end and a plurality of passages defined by internal walls of the substrate extending therethrough, wherein the interface between the passages and the internal walls is defined by the surface of the internal walls;

(ii) a first coating comprising one or more of a vanadium oxide and a zeolitic material comprising one or more of copper and iron;

(iii) a second coating comprising a platinum group metal component supported on a non-zeolitic oxidic material, wherein the platinum group metal component supported on the non-zeolitic oxidic material is present in the second coating at a first loading L1, wherein the first loading is the sum of the loading of the platinum group metal component and the loading of the non-zeolitic oxidic material;

the second coating further comprising a zeolitic material comprising one or more of copper and iron, wherein the zeolitic material comprising one or more of copper and iron is present in the second coating at a second loading L2, wherein the second loading is the sum of the loading of the zeolitic material and the loading of the one or more of copper and iron;

wherein the second coating is disposed on the surface of the internal walls over y % of the axial length of the substrate from the outlet end to the inlet end, with y being in the range of from 10 to 90;

wherein the first coating extends over x % of the axial length of the substrate from the inlet end to the outlet end and is disposed on the second coating and on the surface of the internal walls, with x being in the range of from 95 to 100;

wherein the ratio of the first loading, in g/l, to the second loading, in g/l, L1:L2, is of at least 1.1:1.

It is preferred that x is in the range of from 98 to 100, more preferably in the range of from 99 to 100.

It is preferred that y is in the range of from 20 to 80, more preferably in the range of from 40 to 75, more preferably in the range of from 50 to 72, more preferably in the range of from 60 to 70. It is more preferred that x is in the range of from 99 to 100 and that y is in the range of from 50 to 72, more preferably in the range of from 60 to 70.

It is preferred that the first coating (ii) comprises a zeolitic material comprising one or more of copper and iron.

As to the zeolitic material comprised in the first coating, it is preferred that it has a framework type selected from the group consisting of AEI, GME, CHA, MFI, BEA, FAU, MOR, a mixture of two or more thereof and a mixed type of two or more thereof, more preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof. It is more preferred that the zeolitic material comprised in the first coating has a framework type CHA or AEI, more preferably CHA.

Therefore, the present invention preferably relates to a catalyst for the oxidation of NO, for the oxidation of ammonia and for the selective catalytic reduction of NOx, comprising (i) a substrate comprising an inlet end, an outlet end, a substrate axial length extending from the inlet end to the outlet end and a plurality of passages defined by internal walls of the substrate extending therethrough, wherein the interface between the passages and the internal walls is defined by the surface of the internal walls;

(ii) a first coating comprising a zeolitic material comprising one or more of copper and iron, wherein the zeolitic material has a framework type CHA or AEI, more preferably CHA;

(iii) a second coating comprising a platinum group metal component supported on a non-zeolitic oxidic material, wherein the platinum group metal component supported on the non-zeolitic oxidic material is present in the second coating at a first loading L1, wherein the first loading is the sum of the loading of the platinum group metal component and the loading of the non-zeolitic oxidic material;

the second coating further comprising a zeolitic material comprising one or more of copper and iron, wherein the zeolitic material comprising one or more of copper and iron is present in the second coating at a second loading L2, wherein the second loading is the sum of the loading of the zeolitic material and the loading of the one or more of copper and iron;

wherein the second coating is disposed on the surface of the internal walls over y % of the axial length of the substrate from the outlet end to the inlet end, with y being in the range of from 10 to 90;

wherein the first coating extends over x % of the axial length of the substrate from the inlet end to the outlet end and is disposed on the second coating and on the surface of the internal walls, with x being in the range of from 95 to 100;

wherein the ratio of the first loading, in g/l, to the second loading, in g/l, L1:L2, is of at least 1.1:1.

In the context of the present invention, it is preferred that from 95 to 100 weight-%, more preferably from 98 to 100 weight-%, more preferably from 99 to 100 weight-%, more preferably from 99.5 to 100 weight-%, of the framework structure of the zeolitic material comprised in the first coating consist to Si, Al, O, and optionally one or more P and H, wherein in the framework structure, the molar ratio of Si to Al, calculated as molar $SiO_2$:$Al_2O_3$, more preferably is in the range of from 2:1 to 50:1, more preferably in the range of from 4:1 to 45:1, more preferably in the range of from 10:1 to 40:1, more preferably in the range of from 12:1 to 30:1, more preferably in the range of from 13:1 to 25:1, more preferably in the range of from 15:1 to 21:1.

As to the zeolitic material comprised in the first coating, it is preferred that it comprises copper, wherein the amount of copper comprised in the zeolitic material, calculated as CuO, more preferably is in the range of from 1 to 10 weight-%, more preferably in the range of from 2 to 8 weight-%, more preferably in the range of from 3 to 6 weight-%, more preferably in the range of from 4.5 to 6 weight-%, based on the total weight of the zeolitic material.

It is more preferred that the amount of iron, calculated as $Fe_2O_3$, comprised in the zeolitic material comprised in the first coating, is of at most 0.01 weight-%, more preferably in the range of from 0 to 0.001 weight-%, more preferably in the range of from 0 to 0.0001 weight-%, based on the total weight of the zeolitic material. In other words, it is more preferred that the zeolitic material comprised in the first coating is substantially free, more preferably free, of iron.

Alternatively, it is preferred that the zeolitic material comprised in the first coating comprises iron, wherein the amount of iron comprised in the zeolitic material, calculated as $Fe_2O_3$, more preferably is in the range of from 0.1 to 10.0 weight-%, more preferably in the range of from 1.0 to 7.0 weight-%, more preferably in the range of from 2.5 to 5.5 weight-%, based on the total weight of the zeolitic material. It is more preferred that from 95 to 100 weight-%, more preferably from 98 to 100 weight-%, more preferably from 99 to 100 weight-%, more preferably from 99.5 to 100 weight-%, of the framework structure of the zeolitic material comprised in the first coating consist to Si, Al, O, and optionally one or more P and H, wherein in the framework structure, the molar ratio of Si to Al, calculated as $SiO_2$:$Al_2O_3$, more preferably is in the range of from 2:1 to 50:1, more preferably in the range of from 4:1 to 45:1, more preferably in the range of from 10:1 to 40:1, more preferably in the range of from 12:1 to 30:1, more preferably in the range of from 13:1 to 25:1, more preferably in the range of from 15:1 to 21:1.

Therefore, the present invention preferably relates to a catalyst for the oxidation of NO, for the oxidation of ammonia and for the selective catalytic reduction of NOx, comprising (i) a substrate comprising an inlet end, an outlet end, a substrate axial length extending from the inlet end to the outlet end and a plurality of passages defined by internal walls of the substrate extending therethrough, wherein the interface between the passages and the internal walls is defined by the surface of the internal walls;

(ii) a first coating comprising a zeolitic material comprising copper, wherein the zeolitic material has a framework type CHA or AEI, more preferably CHA, and wherein the amount of copper comprised in the zeolitic material, calculated as CuO, more preferably is in the range of from 1 to 10 weight-%;

(iii) a second coating comprising a platinum group metal component supported on a non-zeolitic oxidic material, wherein the platinum group metal component supported on the non-zeolitic oxidic material is present in the second coating at a first loading L1, wherein the first loading is the sum of the loading of the platinum group metal component and the loading of the non-zeolitic oxidic material;

the second coating further comprising a zeolitic material comprising one or more of copper and iron, wherein the zeolitic material comprising one or more of copper and iron is present in the second coating at a second loading L2, wherein the second loading is the sum of the loading of the zeolitic material and the loading of the one or more of copper and iron;

wherein the second coating is disposed on the surface of the internal walls over y % of the axial length of the substrate from the outlet end to the inlet end, with y being in the range of from 10 to 90;

wherein the first coating extends over x % of the axial length of the substrate from the inlet end to the outlet end and is disposed on the second coating and on the surface of the internal walls, with x being in the range of from 95 to 100;

wherein the ratio of the first loading, in g/l, to the second loading, in g/l, L1:L2, is of at least 1.1:1.

In the context of the present invention, it is preferred that the first coating (ii) comprises the zeolitic material comprising one or more of copper and iron at a loading in the range of from 0.5 to 4 g/in$^3$, more preferably in the range of from 0.75 to 3.5 g/in$^3$, more preferably in the range of from 1 to 3 g/in$^3$, more preferably in the range of from 1.5 to 2.5 g/in$^3$.

It is preferred that the zeolitic material comprised in the first coating, more preferably having a framework type CHA, has a mean crystallite size of at least 0.5 micrometer, more preferably in the range of from 0.5 to 1.5 micrometers, more preferably in the range of from 0.6 to 1.0 micrometer, more preferably in the range of from 0.6 to 0.8 micrometer determined via scanning electron microscopy.

It is preferred that the first coating further comprises a first oxidic material, wherein the first oxidic material more preferably comprises one or more of zirconia, alumina, titania, silica, and a mixed oxide comprising two or more of Zr, Al, Ti, and Si, more preferably comprises one or more of alumina and zirconia, more preferably comprises zirconia.

It is preferred that the first coating comprises the first oxidic material in an amount in the range of from 0.5 to 10 weight-%, more preferably in the range of from 1 to 7 weight-%, more preferably in the range of from 3 to 6 weight-%, based on the total weight of the zeolitic material comprised in the first coating.

It is preferred that the first coating comprises the first oxidic material at a loading in the range of from 0.01 to 0.2 g/in$^3$, more preferably in the range of from 0.02 to 0.15 g/in$^3$, more preferably in the range of from 0.03 to 0.10 g/in$^3$.

Preferably from 95 to 100 weight-%, more preferably from 98 to 100 weight-%, more preferably from 99 to 100 weight-%, more preferably from 99.5 to 100 weight-%, of the first coating consist of a zeolitic material comprising one or more of copper and iron, and more preferably a first oxidic material as defined in the foregoing.

In the context of the present invention, it is alternatively preferred that the first coating comprises a vanadium oxide, wherein the vanadium oxide more preferably is one or more of vanadium (V) oxide, a vanadium (IV) oxide and a vanadium (III) oxide, wherein the vanadium oxide optionally comprises one or more of tungsten, iron and antimony.

It is more preferred that the vanadium oxide is supported on an oxidic support material comprising one or more of titanium, silicon and zirconium, more preferably comprising one or more of titanium and silicon, wherein the oxidic support material more preferably is one or more of titania and silica, more preferably titania and silica, wherein more preferably from 80 to 95 weight-% of the oxidic support material consist of titania.

It is preferred according to said alternative that the first coating comprises the vanadium oxide, calculated as $V_2O_5$, at a loading in the range of from 1 to 6 g/in$^3$, more preferably in the range of from 2 to 4 g/in$^3$.

It is preferred according to said alternative that from 95 to 100 weight-%, more preferably from 98 to 100 weight-%, more preferably from 99 to 100 weight-%, more preferably from 99.5 to 100 weight-%, of the first coating consist of vanadium oxide supported on said oxidic support material.

In the context of the present invention, it is preferred that from 0 to 0.001 weight-%, more preferably from 0 to 0.0001 weight-%, more preferably from 0 to 0.00001 weight-%, of the first coating consist of platinum, more preferably of platinum, palladium and rhodium, more preferably of platinum, palladium, rhodium, osmium and iridium, more preferably of any noble metals. In other words, it is preferred that the first coating is substantially free, more preferably free, of platinum, more preferably of platinum, palladium and rhodium, more preferably of platinum, palladium, rhodium, osmium and iridium, more preferably of any noble metals.

It is preferred that the catalyst comprises the first coating (ii) at a loading in the range of from 0.5 to 7 g/in$^3$, more preferably in the range of from 1 to 5 g/in$^3$, more preferably in the range of from 1.5 to 3 g/in$^3$.

It is preferred that the first coating comprises, more preferably consists of, a nitrogen oxide (NOx) reduction component.

As to the second coating, it is preferred that the platinum group metal component comprised in the second coating is one or more of platinum, palladium and rhodium, more preferably one or more of platinum and palladium. It is more preferred that the platinum group metal component is platinum.

It is preferred that the second coating comprises the platinum group metal component at a loading, calculated as elemental platinum group metal, in the range of from 2 to 50 g/ft$^3$, more preferably in the range of from 5 to 30 g/ft$^3$, more preferably in the range of from 10 to 15 g/ft$^3$. It is more preferred that the second coating comprises platinum at a loading, calculated as elemental platinum, in the range of from 2 to 50 g/ft$^3$, more preferably in the range of from 5 to 30 g/ft$^3$, more preferably in the range of from 10 to 15 g/ft$^3$.

It is preferred that the second coating comprises the platinum group metal component at an amount in the range of from 0.1 to 3 weight-%, more preferably in the range of from 0.25 to 1.5 weight-%, more preferably in the range of from 0.5 to 1 weight-%, based on the weight of the non-zeolitic oxidic material comprised in the second coating.

It is preferred that the non-zeolitic oxidic material onto which the platinum group metal component of the second coating is supported comprises, more preferably consists of, one or more of alumina, zirconia, titania, silica, ceria, and a mixed oxide comprising two or more of Al, Zr, Ti, Si, and Ce, more preferably one or more of alumina, zirconia, titania and silica, more preferably one or more of titania and silica.

Therefore, the present invention preferably relates to a catalyst for the oxidation of NO, for the oxidation of ammonia and for the selective catalytic reduction of NOx, comprising (i) a substrate comprising an inlet end, an outlet end, a substrate axial length extending from the inlet end to the outlet end and a plurality of passages defined by internal walls of the substrate extending therethrough, wherein the interface between the passages and the internal walls is defined by the surface of the internal walls;

(ii) a first coating comprising one or more of a vanadium oxide and a zeolitic material comprising one or more of copper and iron;

(iii) a second coating comprising platinum supported on a non-zeolitic oxidic material, wherein the platinum supported on the non-zeolitic oxidic material is present in the second coating at a first loading L1, wherein the first loading is the sum of the loading of the platinum and the loading of the non-zeolitic oxidic material, wherein the non-zeolitic oxidic material comprises one or more of alumina, zirconia, titania, silica, ceria, and a mixed oxide comprising two or more of Al, Zr, Ti, Si, and Ce;

the second coating further comprising a zeolitic material comprising one or more of copper and iron, wherein the zeolitic material comprising one or more of copper and iron is present in the second coating at a second loading L2, wherein the second loading is the sum of the loading of the zeolitic material and the loading of the one or more of copper and iron;

wherein the second coating is disposed on the surface of the internal walls over y % of the axial length of the substrate from the outlet end to the inlet end, with y being in the range of from 10 to 90;

wherein the first coating extends over x % of the axial length of the substrate from the inlet end to the outlet end and is disposed on the second coating and on the surface of the internal walls, with x being in the range of from 95 to 100;

wherein the ratio of the first loading, in g/l, to the second loading, in g/l, L1:L2, is of at least 1.1:1. It is more preferred that the present invention relates to a catalyst for the oxidation of NO, for the oxidation of ammonia and for the selective catalytic reduction of NOx, comprising (i) a substrate comprising an inlet end, an outlet end, a substrate axial length extending from the inlet end to the outlet end and a plurality of passages defined by internal walls of the substrate extending therethrough, wherein the interface between the passages and the internal walls is defined by the surface of the internal walls;

(ii) a first coating comprising a zeolitic material comprising copper, wherein the zeolitic material has a framework type CHA or AEI, more preferably CHA and wherein the amount of copper comprised in the zeolitic material, calculated as CuO, more preferably is in the range of from 1 to 10 weight-%;

(iii) a second coating comprising platinum supported on a non-zeolitic oxidic material, wherein the platinum supported on the non-zeolitic oxidic material is present in the second coating at a first loading L1, wherein the first loading is the sum of the loading of the platinum and the loading of the non-zeolitic oxidic material, wherein the non-zeolitic oxidic material comprises one or more of alumina, zirconia, titania, silica, ceria, and a mixed oxide comprising two or more of Al, Zr, Ti, Si, and Ce;

the second coating further comprising a zeolitic material comprising one or more of copper and iron, wherein the zeolitic material comprising one or more of copper and iron is present in the second coating at a second loading L2, wherein the second loading is the sum of the loading of the zeolitic material and the loading of the one or more of copper and iron;

wherein the second coating is disposed on the surface of the internal walls over y % of the axial length of the substrate from the outlet end to the inlet end, with y being in the range of from 10 to 90;

wherein the first coating extends over x % of the axial length of the substrate from the inlet end to the outlet end and is disposed on the second coating and on the surface of the internal walls, with x being in the range of from 95 to 100;

wherein the ratio of the first loading, in g/l, to the second loading, in g/l, L1:L2, is of at least 1.1:1.

In the context of the present invention, as to the non-zeolitic oxidic material comprised in the second coating, it is preferred that from 90 to 100 weight-%, more preferably from 95 to 100 weight-%, more preferably from 99 to 100 weight-%, more preferably from 99.5 to 100 weight-%, of the non-zeolitic oxidic material of the second coating consist of titania, and optionally silica. It is more preferred that from 60 to 100 weight-%, more preferably from 80 to 100 weight-%, more preferably from 85 to 95 weight-%, of the non-zeolitic oxidic material of the second coating consists of titania and wherein more preferably from 0 to 40 weight-%, more preferably from 0 to 20 weight-%, more preferably from 5 to 15 weight-%, of the non-zeolitic oxidic material of the second coating consist of silica.

It is preferred that the second coating comprises the non-zeolitic oxidic material at a loading in the range of from 0.25 to 3 $g/in^3$, more preferably in the range of from 0.5 to 2 $g/in^3$, more preferably in the range of from 0.75 to 1.5 $g/in^3$.

It is preferred that the zeolitic material comprised in the second coating has a framework type selected from the group consisting of AEI, GME, CHA, MFI, BEA, FAU, MOR, a mixture of two or more thereof and a mixed type of two or more thereof, more preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof. It is more preferred that the zeolitic material of the second coating has a framework type CHA or AEI, more preferably CHA.

It is preferred that the zeolitic material comprised in the second coating comprises copper, wherein the amount of copper comprised in the zeolitic material, calculated as CuO, more preferably is in the range of from 1 to 10 weight-%, more preferably in the range of from 2 to 8 weight-%, more preferably in the range of from 3 to 6 weight-%, more preferably in the range of from 4.5 to 6 weight-%, based on the total weight of the zeolitic material. As to the second coating, it is more preferred that it comprises platinum supported on a non-zeolitic oxidic material, wherein the platinum supported on the non-zeolitic oxidic material is present in the second coating at a first loading L1, wherein the first loading is the sum of the loading of the platinum and the loading of the non-zeolitic oxidic material, wherein the non-zeolitic oxidic material comprises one or more of alumina, zirconia, titania, silica, ceria, and a mixed oxide comprising two or more of Al, Zr, Ti, Si, and Ce;

and that it further comprises a zeolitic material comprising copper, wherein the zeolitic material comprising copper is present in the second coating at a second loading L2, wherein the second loading is the sum of the loading of the zeolitic material and the loading of the one or more of copper and iron, wherein the zeolitic material of the second coating has a framework type CHA or AEI, more preferably CHA.

In the context of the present invention, it is preferred that from 95 to 100 weight-%, more preferably from 98 to 100 weight-%, more preferably from 99 to 100 weight-%, more preferably from 99.5 to 100 weight-%, of the framework structure of the zeolitic material of the second coating consist to Si, Al, O, and optionally one or more of H and P, wherein in the framework structure, the molar ratio of Si to Al, calculated as $SiO_2$:$Al_2O_3$, more preferably is in the range of from 2:1 to 50:1, more preferably in the range of from 4:1 to 45:1, more preferably in the range of from 10:1 to 40:1, more preferably in the range of from 12:1 to 30:1, more preferably in the range of from 13:1 to 25:1, more preferably in the range of from 15:1 to 21:1.

It is more preferred that the amount of iron comprised in the zeolitic material of the second coating, calculated as $Fe_2O_3$, is of at most 0.01 weight-%, more preferably in the range of from 0 to 0.001 weight-%, more preferably in the range of from 0 to 0.0001 weight-%, based on the total weight of the zeolitic material. In other words, it is more preferred that the zeolitic material of the second coating is substantially free, more preferably free, of iron.

As an alternative, it is preferred that the zeolitic material comprised in the second coating comprises iron, wherein the amount of iron comprised in the zeolitic material, calculated as $Fe_2O_3$, more preferably is in the range of from 0.1 to 10.0 weight-%, more preferably in the range of from 1.0 to 7.0 weight-%, more preferably in the range of from 2.5 to 5.5 weight-%, based on the total weight of the zeolitic material. According to said alternative, it is preferred that from 95 to 100 weight-%, more preferably from 98 to 100 weight-%, more preferably from 99 to 100 weight-%, more preferably from 99.5 to 100 weight-%, of the framework structure of the zeolitic material consist to Si, Al, O, and optionally one or more of H and P, wherein in the framework structure, the molar ratio of Si to Al, calculated as $SiO_2$:$Al_2O_3$, more preferably is in the range of from 2:1 to 50:1, more preferably in the range of from 4:1 to 45:1, more preferably in the range of from 10:1 to 40:1, more preferably in the range of from 12:1 to 30:1, more preferably in the range of from 13:1 to 25:1, more preferably in the range of from 15:1 to 21:1.

In the context of the present invention, it preferred that the second coating comprises the zeolitic material comprising one or more of copper and iron at a loading in the range of from 0.05 to 2 g/in$^3$, more preferably in the range of from 0.08 to 1 g/in$^3$, more preferably in the range of from 0.1 to 0.5 g/in$^3$.

It is preferred that the zeolitic material comprised in the second coating, more preferably having a framework type CHA, has a mean crystallite size of at least 0.5 micrometer, more preferably in the range of from 0.5 to 1.5 micrometers, more preferably in the range of from 0.6 to 1.0 micrometer, more preferably in the range of from 0.6 to 0.8 micrometer determined via scanning electron microscopy.

As to the second coating, it is preferred that it further comprises a second oxidic material, wherein the second oxidic material more preferably comprises one or more of silica, alumina, titania, zirconia, and a mixed oxide comprising two or more of Si, Al, Ti and Zr, more preferably one or more of silica and alumina, more preferably silica. It is more preferred that the second coating comprises the second oxidic material at an amount in the range of from 0.5 to 10 weight-%, more preferably in the range of from 2 to 8 weight-%, more preferably in the range of from 4 to 6 weight-%, based on the total weight of the zeolitic material of the second coating.

It is preferred that the second coating comprises the second oxidic material at a loading in the range of from 0.005 to 0.05 g/in$^3$, more preferably in the range of from 0.008 to 0.02 g/in$^3$.

Preferably from 95 to 100 weight-%, more preferably from 98 to 100 weight-%, more preferably from 99 to 100 weight-%, more preferably 99.5 to 100 weight-%, of the second coating consist of the platinum group metal component supported on the non-zeolitic oxidic material, the zeolitic material comprising one or more of copper and iron, and more preferably a second oxidic material as defined in the foregoing.

It is preferred that the second coating comprises, more preferably consists of, one or more nitrogen oxide (NOx) reduction components and one or more ammonia oxidation (AMOx) components.

It is preferred that the catalyst comprises the second coating at a loading in the range of from 0.5 to 5 g/in$^3$, more preferably in the range of from 0.75 to 3 g/in$^3$, more preferably in the range of from 1 to 2.5 g/in$^3$.

It is preferred that, in the second coating, the ratio of the first loading, in g/l, to the second loading, in g/l, L1:L2, is in the range of from 1.1:1 to 50:1, more preferably in the range of from 1.5:1 to 30:1, more preferably in the range of from 1.75:1 to 20:1, more preferably in the range of from 2:1 to 10:1, more preferably in the range of from 2.5:1 to 8:1, more preferably in the range of from 3:1 to 6:1, more preferably in the range of from 3.5:1 to 5:1.

It is preferred that the substrate of the catalyst is a flow-through substrate or a wall-flow filter substrate, more preferably a flow-through substrate.

As to the substrate of the catalyst, it is preferred that it comprises, more preferably consists of, a ceramic substance, wherein the ceramic substance more preferably comprises, more preferably consists of, one or more of an alumina, a silica, a silicate, an aluminosilicate, more preferably a cordierite or a mullite, an aluminotitanate, a silicon carbide, a zirconia, a magnesia, more preferably a spinel, and a titania, more preferably one or more of a silicon carbide and a cordierite, more preferably a cordierite.

It is preferred that the substrate of the catalyst is a flow-through substrate comprising, more preferably consisting of, cordierite.

It is alternatively preferred as to the substrate that it comprises, more preferably consists of, a metallic substance, wherein the metallic substance more preferably comprises, more preferably consists of, oxygen and one or more of iron, chromium, and aluminum.

It is preferred that the catalyst of the present invention consists of the substrate (i), the first coating (ii) and the second coating (iii).

The present invention further relates to a method for preparing a catalyst for the oxidation of NO, for the oxidation of ammonia and for the selective catalytic reduction of NOx, preferably the catalyst according to the present invention, comprising (a) providing an uncoated substrate, the substrate comprising an inlet end, an outlet end, a substrate axial length extending from the inlet end to the outlet end and a plurality of passages defined by internal walls of the substrate extending therethrough, wherein the interface between the passages and the internal walls is defined by the surface of the internal walls;

(b) providing a slurry comprising a solvent, a platinum group metal component, a non-zeolitic oxidic material and a zeolitic material comprising one or more of copper and iron, disposing said slurry on the surface of the internal walls over y % of the substrate axial length from the outlet end to the inlet end, with y being in the range of from 10 to 90, calcining the slurry disposed on the substrate, obtaining a second coating disposed on the surface of the internal walls of the substrate;

(c) providing a slurry comprising a solvent and one or more of a vanadium oxide and a zeolitic material comprising one or more of copper and iron, disposing said slurry over x % of the substrate axial length on the second coating from the inlet end to the outlet end, with x being in the range of from 95 to 100, calcining the slurry disposed on the substrate, obtaining a first coating disposed on the surface of the internal walls of the substrate and on the second coating.

As to (b), it is preferred that it comprises, more preferably consists of, (b.1) forming a slurry with an aqueous mixture of water, a platinum group metal precursor, more preferably of a platinum precursor, a non-zeolitic oxidic material, and a zeolitic material, more preferably having a framework type CHA, comprising one or more of copper and iron;

(b.2) more preferably adding a precursor of a second oxidic material, more preferably a Si-containing precursor, more preferably colloidal silica;

(b.3) disposing the slurry obtained in (b.1), more preferably in (b.2), on the surface of the internal walls over y % of the substrate axial length from the outlet end to the inlet end of the substrate;

(b.4) more preferably drying the slurry disposed on the substrate obtained in (b.3), obtaining a dried slurry-treated substrate;

(b.5) calcining the slurry disposed on the substrate obtained in (b.3), more preferably the dried slurry-treated substrate obtained in (b.4), in a gas atmosphere, more preferably having a temperature in the range of from 300 to 600° C., more preferably in the range of from 350 to 550° C., wherein the gas atmosphere more preferably comprises, more preferably is, one or more of air, lean air, and oxygen, more preferably air.

As to (b.1), it is preferred that it comprises (b.1a) impregnating the platinum group metal precursor, more preferably a platinum precursor, onto the non-zeolitic oxidic material;

(b.1b) calcining the impregnated non-zeolitic oxidic material obtained according to (b.1a);

(b.1c) admixing the platinum group metal supported onto the non zeolitic oxidic material obtained according to (b.1b) with water and the zeolitic material, more preferably having a framework type CHA, comprising one or more of copper and iron.

It is preferred that in (b), more preferably (b.1), more preferably (b.1c), the weight ratio of the weight of the platinum group metal supported onto the non-zeolitic oxidic material to the weight of the zeolitic material comprising one or more of copper and iron is of at least 1.1:1, more preferably in the range of from 1.1:1 to 50:1, more preferably in the range of from 1.5:1 to 30:1, more preferably in the range of from 1.75:1 to 20:1, more preferably in the range of from 2:1 to 10:1, more preferably in the range of from 2.5:1 to 8:1, more preferably in the range of from 3:1 to 6:1, more preferably in the range of from 3.5:1 to 5:1.

It is preferred that, according to (b.4), drying is performed in a gas atmosphere having a temperature in the range of from 90 to 180° C., wherein the gas atmosphere more preferably comprises, more preferably is, one or more of air, lean air, and oxygen, more preferably air.

It is preferred that, according to (b.5), calcining is performed in a gas atmosphere having a temperature in the range of from 350 to 500° C. It is more preferred that the gas atmosphere comprises, more preferably is, one or more of air, lean air, and oxygen, more preferably air.

As to (c), it is preferred that it comprises, more preferably consists of, (c.1) forming a slurry comprising water and a zeolitic material, more preferably having a framework type CHA, comprising one or more of copper and iron, and more preferably a precursor of a first oxidic material, more preferably a Zr-containing precursor, more preferably zirconyl acetate; or forming a slurry with water and a source of a vanadium oxide, more preferably vanadium oxalate, and more preferably adding an oxidic material, more preferably with a dispersant;

(c.2) disposing the slurry obtained in (c.1) over x % of the substrate axial length on the surface of the internal walls and the second coating from the inlet end to the outlet end of the substrate, with x more preferably being in the range of from 98 to 100, more preferably in the range of from 99 to 100;

(c.3) optionally drying the slurry disposed on the substrate obtained in (c.2), obtaining a dried slurry-treated substrate;

(c.4) calcining the slurry disposed on the substrate obtained in (c.2), or the dried slurry-treated substrate obtained in (c.3), in a gas atmosphere, more preferably having a temperature in the range of from 300 to 600° C., more preferably in the range of from 350 to 550° C., wherein the gas atmosphere more preferably comprises, more preferably is, one or more of air, lean air, and oxygen, more preferably air.

It is preferred that, according to (c.3), drying is performed in a gas atmosphere having a temperature in the range of from 90 to 180° C., wherein the gas atmosphere more preferably comprises, more preferably is, one or more of air, lean air, and oxygen, more preferably air.

It is preferred that, according to (c.4), calcining is performed in a gas atmosphere having a temperature in the range of from 350 to 500° C. It is more preferred that the gas atmosphere comprises, more preferably is, one or more of air, lean air, and oxygen, more preferably air.

It is more preferred that y is in the range of from 20 to 80, more preferably in the range of from 40 to 75, more preferably in the range of from 50 to 72, more preferably in the range of from 60 to 70.

It is more preferred that disposing in one or more of (b), and (c), more preferably disposing in (b) and (c), is performed by spraying the slurry onto the substrate or by immersing the substrate into the slurry, more preferably by immersing the substrate into the slurry.

It is preferred that the method according to the present invention consists of (a), (b) and (c).

The present invention further relates to a catalyst for the oxidation of NO, for the oxidation of ammonia and for the selective catalytic reduction of NOx, preferably a catalyst for the oxidation of NO, for the oxidation of ammonia and for the selective catalytic reduction of NOx according to the present invention, obtainable or obtained by a process according to the present invention.

The present invention further relates to a use of a catalyst for the oxidation of NO, for the oxidation of ammonia and for the selective catalytic reduction of NOx according to the present invention for the simultaneous selective catalytic reduction of NOx, the oxidation of ammonia and the oxidation of NO.

The present invention further relates to an exhaust gas treatment system for treating an exhaust gas stream exiting an internal combustion engine, preferably a diesel engine, said exhaust gas treatment system having an upstream end for introducing said exhaust gas stream into said exhaust gas treatment system, wherein said exhaust gas treatment system comprises a catalyst for the oxidation of NO, for the oxidation of ammonia and for the selective catalytic reduction of NOx according to the present invention and as defined above and one or more of a selective catalytic reduction catalyst, a combined selective catalytic reduction/ammonia oxidation catalyst, and a catalyzed soot filter.

It is preferred that the system comprises the catalyst according to the present invention and a selective catalytic reduction catalyst, wherein the selective catalytic reduction catalyst is positioned upstream of the catalyst according to the present invention. It is more preferred that the system further comprises a first urea injector, the urea injector being positioned upstream of the selective catalytic reduction catalyst.

It is preferred that the system further comprises a catalyzed soot filter, wherein the catalyzed soot filter is positioned downstream of the catalyst according to the present invention.

It is more preferred that the system further comprises a combined selective catalytic reduction/ammonia oxidation catalyst and a second selective catalytic reduction catalyst, wherein the combined selective catalytic reduction/ammonia oxidation catalyst is positioned downstream of the second selective catalytic reduction catalyst and the second catalytic reduction catalyst is positioned upstream of the combined selective catalytic reduction/ammonia oxidation catalyst and downstream of the catalyzed soot filter. It is more preferred that the system further comprises a second urea injector, the second urea injector being positioned downstream of the catalyzed soot filter and upstream of the second selective catalytic reduction catalyst.

The present invention further relates to a method for the simultaneous selective catalytic reduction of NOx, the oxidation of ammonia and the oxidation of nitrogen monoxide, the method comprising (1) providing a gas stream comprising one or more of NOx, ammonia and nitrogen monoxide;

(2) contacting the gas stream provided in (1) with a catalyst for the oxidation of NO, for the oxidation of ammonia and for the selective catalytic reduction of NOx according to the present invention.

The present invention is illustrated by the following set of embodiments and combinations of embodiments resulting from the dependencies and back-references as indicated. In particular, it is noted that in each instance where a range of embodiments is mentioned, for example in the context of a term such as "The catalyst of any one of embodiments 1 to 4", every embodiment in this range is meant to be explicitly disclosed for the skilled person, i.e. the wording of this term is to be understood by the skilled person as being synonymous to "The catalyst of any one of embodiments 1, 2, 3 and 4". Further, it is explicitly noted that the following set of embodiments is not the set of claims determining the extent of protection, but represents a suitably structured part of the description directed to general and preferred aspects of the present invention.

1. A catalyst for the oxidation of NO, for the oxidation of ammonia and for the selective catalytic reduction of NOx, comprising
   (i) a substrate comprising an inlet end, an outlet end, a substrate axial length extending from the inlet end to the outlet end and a plurality of passages defined by internal walls of the substrate extending therethrough, wherein the interface between the passages and the internal walls is defined by the surface of the internal walls;
   (ii) a first coating comprising one or more of a vanadium oxide and a zeolitic material comprising one or more of copper and iron;
   (iii) a second coating comprising a platinum group metal component supported on a non-zeolitic oxidic material, wherein the platinum group metal component supported on the non-zeolitic oxidic material is present in the second coating at a first loading L1, wherein the first loading is the sum of the loading of the platinum group metal component and the loading of the non-zeolitic oxidic material;
   the second coating further comprising a zeolitic material comprising one or more of copper and iron, wherein the zeolitic material comprising one or more of copper and iron is present in the second coating at a second loading L2, wherein the second loading is the sum of the loading of the zeolitic material and the loading of the one or more of copper and iron;

wherein the second coating is disposed on the surface of the internal walls over y % of the axial length of the substrate from the outlet end to the inlet end, with y being in the range of from 10 to 90;

wherein the first coating extends over x % of the axial length of the substrate from the inlet end to the outlet end and is disposed on the second coating and on the surface of the internal walls, with x being in the range of from 95 to 100;

wherein the ratio of the first loading, in g/l, to the second loading, in g/l, L1:L2, is of at least 1.1:1.

2. The catalyst of embodiment 1, wherein x is in the range of from 98 to 100, preferably in the range of from 99 to 100.
3. The catalyst of embodiment 1 or 2, wherein y is in the range of from 20 to 80, preferably in the range of from 40 to 75, more preferably in the range of from 50 to 72, more preferably in the range of from 60 to 70.
4. The catalyst of any one of embodiments 1 to 3, wherein the first coating (ii) comprises a zeolitic material comprising one or more of copper and iron.
5. The catalyst of any one of embodiments 1 to 4, wherein the zeolitic material comprised in the first coating has a framework type selected from the group consisting of AEI, GME, CHA, MFI, BEA, FAU, MOR, a mixture of two or more thereof and a mixed type of two or more thereof, preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material comprised in the first coating more preferably has a framework type CHA or AEI, more preferably CHA.
6. The catalyst of any one of embodiments 1 to 5, wherein from 95 to 100 weight-%, preferably from 98 to 100 weight-%, more preferably from 99 to 100 weight-%, more preferably from 99.5 to 100 weight-%, of the framework structure of the zeolitic material comprised in the first coating consist to Si, Al, O, and optionally one or more P and H, wherein in the framework structure, the molar ratio of Si to Al, calculated as molar $SiO_2$:$Al_2O_3$, preferably is in the range of from 2:1 to 50:1, more preferably in the range of from 4:1 to 45:1, more preferably in the range of from 10:1 to 40:1, more preferably in the range of from 12:1 to 30:1, more preferably in the range of from 13:1 to 25:1, more preferably in the range of from 15:1 to 21:1.
7. The catalyst of any one of embodiments 1 to 6, wherein the zeolitic material comprised in the first coating comprises copper, wherein the amount of copper comprised in the zeolitic material, calculated as CuO, preferably is in the range of from 1 to 10 weight-%, more preferably in the range of from 2 to 8 weight-%, more preferably in the range of from 3 to 6 weight-%, more preferably in the range of from 4.5 to 6 weight-%, based on the total weight of the zeolitic material.
8. The catalyst of embodiment 7, wherein the amount of iron, calculated as $Fe_2O_3$, comprised in the zeolitic material comprised in the first coating, is of at most 0.01 weight-%, preferably in the range of from 0 to 0.001 weight-%, more preferably in the range of from 0 to 0.0001 weight-%, based on the total weight of the zeolitic material.
9. The catalyst of any one of embodiments 1 to 5, wherein the zeolitic material comprised in the first coating comprises iron, wherein the amount of iron comprised in the zeolitic material, calculated as $Fe_2O_3$, preferably is in the range of from 0.1 to 10.0 weight-%, more preferably in the range of from 1.0 to 7.0 weight-%, more preferably in the range of from 2.5 to 5.5 weight-%, based on the total weight of the zeolitic material, and wherein preferably from 95 to 100 weight-%, more preferably from 98 to 100 weight-%, more preferably from 99 to 100 weight-%, more preferably from 99.5 to 100 weight-%, of the framework structure of the zeolitic material comprised in the first coating consist to Si, Al, O, and optionally one or more P and H, wherein in the framework structure, the molar ratio of Si to Al, calculated as $SiO_2$:$Al_2O_3$, preferably is in the range of from 2:1 to 50:1, more preferably in the range of from 4:1 to 45:1, more preferably in the range of from 10:1 to 40:1, more preferably in the range of from 12:1 to 30:1, more preferably in the range of from 13:1 to 25:1, more preferably in the range of from 15:1 to 21:1.

10. The catalyst of any one of embodiments 1 to 9, wherein the first coating (ii) comprises the zeolitic material comprising one or more of copper and iron at a loading in the range of from 0.5 to 4 g/in$^3$, preferably in the range of from 0.75 to 3.5 g/in$^3$, more preferably in the range of from 1 to 3 g/in$^3$, more preferably in the range of from 1.5 to 2.5 g/in$^3$.

11. The catalyst of any one of embodiments 1 to 10, wherein the zeolitic material comprised in the first coating, preferably having a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

12. The catalyst of any one of embodiments 1 to 11, wherein the first coating further comprises a first oxidic material, wherein the first oxidic material preferably comprises one or more of zirconia, alumina, titania, silica, and a mixed oxide comprising two or more of Zr, Al, Ti, and Si, more preferably comprises one or more of alumina and zirconia, more preferably comprises zirconia.

13. The catalyst of embodiment 12, wherein the first coating comprises the first oxidic material in an amount in the range of from 0.5 to 10 weight-%, preferably in the range of from 1 to 7 weight-%, more preferably in the range of from 3 to 6 weight-%, based on the total weight of the zeolitic material comprised in the first coating;
   wherein the first coating preferably comprises the first oxidic material at a loading in the range of from 0.01 to 0.2 g/in$^3$, more preferably in the range of from 0.02 to 0.15 g/in$^3$, more preferably in the range of from 0.03 to 0.10 g/in$^3$.

14. The catalyst of any one of embodiments 1 to 13, wherein from 95 to 100 weight-%, preferably from 98 to 100 weight-%, more preferably from 99 to 100 weight-%, more preferably from 99.5 to 100 weight-%, of the first coating consist of a zeolitic material comprising one or more of copper and iron, and preferably a first oxidic material as defined in embodiment 13.

15. The catalyst of any one of embodiments 1 to 3, wherein the first coating comprises a vanadium oxide, wherein the vanadium oxide preferably is one or more of vanadium (V) oxide, a vanadium (IV) oxide and a vanadium (III) oxide, wherein the vanadium oxide optionally comprises one or more of tungsten, iron and antimony.

16. The catalyst of embodiment 15, wherein the vanadium oxide is supported on an oxidic support material comprising one or more of titanium, silicon and zirconium, preferably comprising one or more of titanium and silicon, wherein the oxidic support material more preferably is one or more of titania and silica, more preferably titania and silica, wherein preferably from 80 to 95 weight-% of the oxidic support material consist of titania.

17. The catalyst of embodiment 15 or 16, wherein the first coating comprises the vanadium oxide, calculated as $V_2O_5$, at a loading in the range of from 1 to 6 g/in$^3$, preferably in the range of from 2 to 4 g/in$^3$.

18. The catalyst of any one of embodiments 15 to 17, wherein from 95 to 100 weight-%, preferably from 98 to 100 weight-%, more preferably from 99 to 100 weight-%, more preferably from 99.5 to 100 weight-%, of the first coating consist of vanadium oxide supported on said oxidic support material.

19. The catalyst of any one of embodiments 1 to 18, wherein from 0 to 0.001 weight-%, preferably from 0 to 0.0001 weight-%, more preferably from 0 to 0.00001 weight-%, of the first coating consist of platinum, preferably of platinum, palladium and rhodium, more preferably of platinum, palladium, rhodium, osmium and iridium, more preferably of any noble metals.

20. The catalyst of any one of embodiments 1 to 19, wherein the catalyst comprises the first coating (ii) at a loading in the range of from 0.5 to 7 g/in$^3$, preferably in the range of from 1 to 5 g/in$^3$, more preferably in the range of from 1.5 to 3 g/in$^3$.

21. The catalyst of any one of embodiments 1 to 20, wherein the first coating comprises, preferably consists of, a nitrogen oxide (NOx) reduction component.

22. The catalyst of any one of embodiments 1 to 21, wherein the platinum group metal component comprised in the second coating is one or more of platinum, palladium and rhodium, preferably one or more of platinum and palladium, wherein the platinum group metal component more preferably is platinum.

23. The catalyst of any one of embodiments 1 to 22, wherein the second coating comprises the platinum group metal component at a loading, calculated as elemental platinum group metal, in the range of from 2 to 50 g/ft$^3$, preferably in the range of from 5 to 30 g/ft$^3$, more preferably in the range of from 10 to 15 g/ft$^3$.

24. The catalyst of any one of embodiments 1 to 23, wherein the second coating comprises the platinum group metal component at an amount in the range of from 0.1 to 3 weight-%, preferably in the range of from 0.25 to 1.5 weight-%, more preferably in the range of from 0.5 to 1 weight-%, based on the weight of the non-zeolitic oxidic material comprised in the second coating.

25. The catalyst of any one of embodiments 1 to 24, wherein the non-zeolitic oxidic material onto which the platinum group metal component of the second coating is supported comprises, preferably consists of, one or more of alumina, zirconia, titania, silica, ceria, and a mixed oxide comprising two or more of Al, Zr, Ti, Si, and Ce, preferably one or more of alumina, zirconia, titania and silica, more preferably one or more of titania and silica.

26. The catalyst of embodiment 25, wherein from 90 to 100 weight-%, preferably from 95 to 100 weight-%, more preferably from 99 to 100 weight-%, more preferably from 99.5 to 100 weight-%, of the non-zeolitic oxidic material of the second coating consist of titania, and optionally silica;
   wherein preferably from 60 to 100 weight-%, more preferably from 80 to 100 weight-%, more preferably from 85 to 95 weight-%, of the non-zeolitic oxidic material of the second coating consists of titania and wherein preferably from 0 to 40 weight-%, more preferably from 0 to 20 weight-%, more preferably from 5 to 15 weight-%, of the non-zeolitic oxidic material of the second coating consist of silica.

27. The catalyst of any one of embodiments 1 to 26, wherein the second coating comprises the non-zeolitic oxidic material at a loading in the range of from 0.25 to 3 g/in$^3$, preferably in the range of from 0.5 to 2 g/in$^3$, more preferably in the range of from 0.75 to 1.5 g/in$^3$.

28. The catalyst of any one of embodiments 1 to 27, wherein the zeolitic material comprised in the second coating has a framework type selected from the group consisting of AEI, GME, CHA, MFI, BEA, FAU, MOR, a mixture of two or more thereof and a mixed type of two or more thereof, preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material of the second coating more preferably has a framework type CHA or AEI, more preferably CHA.
29. The catalyst of any one of embodiments 1 to 28, wherein the zeolitic material comprised in the second coating comprises copper, wherein the amount of copper comprised in the zeolitic material, calculated as CuO, preferably is in the range of from 1 to 10 weight-%, more preferably in the range of from 2 to 8 weight-%, more preferably in the range of from 3 to 6 weight-%, more preferably in the range of from 4.5 to 6 weight-%, based on the total weight of the zeolitic material.
30. The catalyst of any one of embodiments 1 to 29, wherein from 95 to 100 weight-%, preferably from 98 to 100 weight-%, more preferably from 99 to 100 weight-%, more preferably from 99.5 to 100 weight-%, of the framework structure of the zeolitic material of the second coating consist to Si, Al, O, and optionally one or more of H and P, wherein in the framework structure, the molar ratio of Si to Al, calculated as $SiO_2$:$Al_2O_3$, preferably is in the range of from 2:1 to 50:1, more preferably in the range of from 4:1 to 45:1, more preferably in the range of from 10:1 to 40:1, more preferably in the range of from 12:1 to 30:1, more preferably in the range of from 13:1 to 25:1, more preferably in the range of from 15:1 to 21:1.
31. The catalyst of embodiment 29 or 30, wherein the amount of iron comprised in the zeolitic material of the second coating, calculated as $Fe_2O_3$, is of at most 0.01 weight-%, preferably in the range of from 0 to 0.001 weight-%, more preferably in the range of from 0 to 0.0001 weight-%, based on the total weight of the zeolitic material.
32. The catalyst of any one of embodiments 1 to 26, wherein the zeolitic material comprised in the second coating comprises iron, wherein the amount of iron comprised in the zeolitic material, calculated as $Fe_2O_3$, preferably is in the range of from 0.1 to 10.0 weight-%, more preferably in the range of from 1.0 to 7.0 weight-%, more preferably in the range of from 2.5 to 5.5 weight-%, based on the total weight of the zeolitic material, and wherein preferably from 95 to 100 weight-%, more preferably from 98 to 100 weight-%, more preferably from 99 to 100 weight-%, more preferably from 99.5 to 100 weight-%, of the framework structure of the zeolitic material consist to Si, Al, O, and optionally one or more of H and P, wherein in the framework structure, the molar ratio of Si to Al, calculated as $SiO_2$:$Al_2O_3$, preferably is in the range of from 2:1 to 50:1, more preferably in the range of from 4:1 to 45:1, more preferably in the range of from 10:1 to 40:1, more preferably in the range of from 12:1 to 30:1, more preferably in the range of from 13:1 to 25:1, more preferably in the range of from 15:1 to 21:1.
33. The catalyst of any one of embodiments 1 to 32, wherein the second coating comprises the zeolitic material comprising one or more of copper and iron at a loading in the range of from 0.05 to 2 g/in$^3$, preferably in the range of from 0.08 to 1 g/in$^3$, more preferably in the range of from 0.1 to 0.5 g/in$^3$.
34. The catalyst of any one of embodiments 1 to 33, wherein the zeolitic material comprised in the second coating, preferably having a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.
35. The catalyst of any one of embodiments 1 to 34, wherein the second coating further comprises a second oxidic material, wherein the second oxidic material preferably comprises one or more of silica, alumina, titania, zirconia, and a mixed oxide comprising two or more of Si, Al, Ti and Zr, more preferably one or more of silica and alumina, more preferably silica;
    wherein the second coating more preferably comprises the second oxidic material at an amount in the range of from 0.5 to 10 weight-%, more preferably in the range of from 2 to 8 weight-%, more preferably in the range of from 4 to 6 weight-%, based on the total weight of the zeolitic material of the second coating;
    wherein the second coating more preferably comprises the second oxidic material at a loading in the range of from 0.005 to 0.05 g/in$^3$, more preferably in the range of from 0.008 to 0.02 g/in$^3$.
36. The catalyst of any one of embodiments 1 to 35, wherein from 95 to 100 weight-%, preferably from 98 to 100 weight-%, more preferably from 99 to 100 weight-%, more preferably 99.5 to 100 weight-%, of the second coating consist of the platinum group metal component supported on the non-zeolitic oxidic material, the zeolitic material comprising one or more of copper and iron, and preferably a second oxidic material as defined in embodiment 35.
37. The catalyst of any one of embodiments 1 to 36, wherein the second coating comprises, preferably consists of, one or more nitrogen oxide (NOx) reduction components and one or more ammonia oxidation (AMOx) components.
38. The catalyst of any one of embodiments 1 to 37, wherein the catalyst comprises the second coating at a loading in the range of from 0.5 to 5 g/in$^3$, preferably in the range of from 0.75 to 3 g/in$^3$, more preferably in the range of from 1 to 2.5 g/in$^3$.
39. The catalyst of any one of embodiments 1 to 38, wherein, in the second coating, the ratio of the first loading, in g/l, to the second loading, in g/l, L1:L2, is in the range of from 1.1:1 to 50:1, preferably in the range of from 1.5:1 to 30:1, more preferably in the range of from 1.75:1 to 20:1, more preferably in the range of from 2:1 to 10:1, more preferably in the range of from 2.5:1 to 8:1, more preferably in the range of from 3:1 to 6:1, more preferably in the range of from 3.5:1 to 5:1.
40. The catalyst of any one of embodiments 1 to 39, wherein the substrate of the catalyst is a flow-through substrate or a wall-flow filter substrate, preferably a flow-through substrate.

41. The catalyst of any one of embodiments 1 to 40, wherein the substrate of the catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite;
   wherein the substrate of the catalyst preferably is a flow-through substrate comprising, more preferably consisting of, cordierite.
42. The catalyst of any one of embodiments 1 to 40, wherein the substrate of the catalyst comprises, preferably consists of, a metallic substance, wherein the metallic substance preferably comprises, more preferably consists of, oxygen and one or more of iron, chromium, and aluminum.
43. The catalyst of any one of embodiments 1 to 42, consisting of the substrate (i), the first coating (ii) and the second coating (iii).
44. A method for preparing a catalyst for the oxidation of NO, for the oxidation of ammonia and for the selective catalytic reduction of NOx, preferably the catalyst according to any one of embodiments 1 to 43, comprising
   (a) providing an uncoated substrate, the substrate comprising an inlet end, an outlet end, a substrate axial length extending from the inlet end to the outlet end and a plurality of passages defined by internal walls of the substrate extending therethrough, wherein the interface between the passages and the internal walls is defined by the surface of the internal walls;
   (b) providing a slurry comprising a solvent, a platinum group metal component, a non-zeolitic oxidic material and a zeolitic material comprising one or more of copper and iron, disposing said slurry on the surface of the internal walls over y % of the substrate axial length from the outlet end to the inlet end, with y being in the range of from 10 to 90, calcining the slurry disposed on the substrate, obtaining a second coating disposed on the surface of the internal walls of the substrate;
   (c) providing a slurry comprising a solvent and one or more of a vanadium oxide and a zeolitic material comprising one or more of copper and iron, disposing said slurry over x % of the substrate axial length on the second coating from the inlet end to the outlet end, with x being in the range of from 95 to 100, calcining the slurry disposed on the substrate, obtaining a first coating disposed on the surface of the internal walls of the substrate and on the second coating.
45. The method of embodiment 44, wherein (b) comprises, preferably consists of,
   (b.1) forming a slurry with an aqueous mixture of water, a platinum group metal precursor, preferably of a platinum precursor, a non-zeolitic oxidic material, and a zeolitic material, preferably having a framework type CHA, comprising one or more of copper and iron;
   (b.2) preferably adding a precursor of a second oxidic material, more preferably a Si-containing precursor, more preferably colloidal silica;
   (b.3) disposing the slurry obtained in (b.1), preferably in (b.2), on the surface of the internal walls over y % of the substrate axial length from the outlet end to the inlet end of the substrate;
   (b.4) preferably drying the slurry disposed on the substrate obtained in (b.3), obtaining a dried slurry-treated substrate;
   (b.5) calcining the slurry disposed on the substrate obtained in (b.3), preferably the dried slurry-treated substrate obtained in (b.4), in a gas atmosphere, preferably having a temperature in the range of from 300 to 600° C., more preferably in the range of from 350 to 550° C., wherein the gas atmosphere preferably comprises, more preferably is, one or more of air, lean air, and oxygen, more preferably air.
46. The method of embodiment 45, wherein, according to (b.4), drying is performed in a gas atmosphere having a temperature in the range of from 90 to 180° C., wherein the gas atmosphere preferably comprises, more preferably is, one or more of air, lean air, and oxygen, more preferably air.
47. The method of embodiment 46 or 47, wherein, according to (b.5), calcining is performed in a gas atmosphere having a temperature in the range of from 350 to 500° C.
48. The method of embodiment 47, wherein the gas atmosphere comprises, preferably is, one or more of air, lean air, and oxygen, more preferably air.
49. The method of any one of embodiments 44 to 48, wherein (c) comprises, preferably consists of,
   (c.1) forming a slurry comprising water and a zeolitic material, preferably having a framework type CHA, comprising one or more of copper and iron, and preferably a precursor of a first oxidic material, more preferably a Zr-containing precursor, more preferably zirconyl acetate; or forming a slurry with water and a source of a vanadium oxide, preferably vanadium oxalate, and preferably adding an oxidic material, more preferably with a dispersant;
   (c.2) disposing the slurry obtained in (c.1) over x % of the substrate axial length on the surface of the internal walls and the second coating from the inlet end to the outlet end of the substrate, with x preferably being in the range of from 98 to 100, more preferably in the range of from 99 to 100;
   (c.3) optionally drying the slurry disposed on the substrate obtained in (c.2), obtaining a dried slurry-treated substrate;
   (c.4) calcining the slurry disposed on the substrate obtained in (c.2), or the dried slurry-treated substrate obtained in (c.3), in a gas atmosphere, preferably having a temperature in the range of from 300 to 600° C., more preferably in the range of from 350 to 550° C., wherein the gas atmosphere preferably comprises, more preferably is, one or more of air, lean air, and oxygen, more preferably air.
50. The method of embodiment 49, wherein according to (c.3), drying is performed in a gas atmosphere having a temperature in the range of from 90 to 180° C., wherein the gas atmosphere preferably comprises, more preferably is, one or more of air, lean air, and oxygen, more preferably air.
51. The method of embodiment 49 or 50, wherein according to (c.4), calcining is performed in a gas atmosphere having a temperature in the range of from 350 to 500° C.

52. The method of embodiment 51, wherein the gas atmosphere comprises, preferably is, one or more of air, lean air, and oxygen, more preferably air.
53. The method of any one of embodiments 44 to 52, wherein y is in the range of from 20 to 80, preferably in the range of from 40 to 75, more preferably in the range of from 50 to 72, more preferably in the range of from 60 to 70.
54. The method of any one of embodiments 44 to 53, wherein disposing in one or more of (b), and (c), preferably disposing in (b) and (c), is performed by spraying the slurry onto the substrate or by immersing the substrate into the slurry, preferably by immersing the substrate into the slurry.
55. The method of any one of embodiments 44 to 54, consisting of (a), (b) and (c).
56. A catalyst for the oxidation of NO, for the oxidation of ammonia and for the selective catalytic reduction of NOx, preferably a catalyst for the oxidation of NO, for the oxidation of ammonia and for the selective catalytic reduction of NOx according to any one of embodiments 1 to 43, obtainable or obtained by a process according to any one of embodiments 44 to 55.
57. Use of a catalyst for the oxidation of NO, for the oxidation of ammonia and for the selective catalytic reduction of NOx according to any one of embodiments 1 to 43 and 56 for the simultaneous selective catalytic reduction of NOx, the oxidation of ammonia and the oxidation of NO.
58. An exhaust gas treatment system for treating an exhaust gas stream exiting an internal combustion engine, preferably a diesel engine, said exhaust gas treatment system having an upstream end for introducing said exhaust gas stream into said exhaust gas treatment system,
    wherein said exhaust gas treatment system comprises a catalyst for the oxidation of NO, for the oxidation of ammonia and for the selective catalytic reduction of NOx according to any one of embodiments 1 to 43 and 56 and one or more of a selective catalytic reduction catalyst, a combined selective catalytic reduction/ammonia oxidation catalyst, and a catalyzed soot filter.
59. The exhaust gas treatment system of embodiment 58, comprising the catalyst according to any one of embodiments 1 to 43 and 56 and a selective catalytic reduction catalyst, wherein the selective catalytic reduction catalyst is positioned upstream of the catalyst according to any one of embodiments 1 to 43 and 56, wherein the system preferably further comprises a first urea injector, the urea injector being positioned upstream of the selective catalytic reduction catalyst.
60. The exhaust gas treatment system of embodiment 58 or 59, further comprising a catalyzed soot filter, wherein the catalyzed soot filter is positioned downstream of the catalyst according to any one of embodiments 1 to 43 and 56.
61. The exhaust gas treatment system of any one of embodiments 58 to 60, further comprises a combined selective catalytic reduction/ammonia oxidation catalyst and a second selective catalytic reduction catalyst, wherein the combined selective catalytic reduction/ammonia oxidation catalyst is positioned downstream of the second selective catalytic reduction catalyst and the second catalytic reduction catalyst is positioned upstream of the combined selective catalytic reduction/ammonia oxidation catalyst and downstream of the catalyzed soot filter;
    wherein the system preferably further comprises a second urea injector, the second urea injector being positioned downstream of the catalyzed soot filter and upstream of the second selective catalytic reduction catalyst.
62. A method for the simultaneous selective catalytic reduction of NOx, the oxidation of ammonia and the oxidation of nitrogen monoxide, the method comprising
    (1) providing a gas stream comprising one or more of NOx, ammonia and nitrogen monoxide;
    (2) contacting the gas stream provided in (1) with a catalyst for the oxidation of NO, for the oxidation of ammonia and for the selective catalytic reduction of NOx according to any one of embodiments 1 to 43 and 56.

In the context of the present invention, the term "loading of a given component/coating" (in g/in$^3$ or g/ft$^3$) refers to the mass of said component/coating per volume of the substrate, wherein the volume of the substrate is the volume which is defined by the cross-section of the substrate times the axial length of the substrate over which said component/coating is present. For example, if reference is made to the loading of a first coating extending over x % of the axial length of the substrate and having a loading of X g/in$^3$, said loading would refer to X gram of the first coating per x % of the volume (in in$^3$) of the entire substrate.

Further, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Furthermore, in the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

Furthermore, in the context of the present invention, the term "noble metals" encompasses metals which are ruthenium, rhodium, palladium, platinum, silver, osmium, iridium and gold.

In the context of the present invention, the term "consists of" with regard to the weight-% of one or more components indicates the weight-% amount of said component(s) based on 100 weight-% of the entity in question. For example, the wording "wherein from 0 to 0.001 weight-% of the first coating consists of platinum" indicates that among the 100 weight-% of the components of which said coating consists of, 0 to 0.001 weight-% is platinum.

The present invention is further illustrated by the following reference examples, comparative examples and examples.

EXAMPLES

Reference Example 1: Determination of the Dv20, Dv50 and Dv90 Values

The particle size distributions were determined by a static light scattering method using Sympatec HELOS equipment, wherein the optical concentration of the sample was in the range of from 5 to 10%.

Reference Example 2: Measurement of the BET Specific Surface Area

The BET specific surface area was determined according to DIN 66131 or DIN ISO 9277 using liquid nitrogen.

Reference Example 3: General Coating Method

In order to coat the flow-through substrate with one or more coatings, the flow-through substrate was suitably immersed vertically in a portion of a given slurry for a specific length of the substrate which was equal to the targeted length of the coating to be applied. In this manner, the slurry contacted the walls of the substrate.

Comparative Example 1: Preparation of a Catalyst not According to the Present Invention (with Three Coatings)

Third Coating (Outlet Bottom Coating):

To a Si-doped titania powder (10 weight-% of $SiO_2$, a BET specific surface area of 200 $m^2/g$ and a Dv90 of 20 micrometers) was added a platinum ammine solution, such that the Si-titania had after calcination a Pt content of 0.81 weight-% based on the weight of Si-titania. This material was added to water and the slurry was milled until the resulting Dv90 was 5.2 microns, determined as described in Reference Example 1. Finally, a colloidal silica binder was mixed into the slurry at a level calculated to be 2.5 weight-% $SiO_2$ (from the binder) after calcination based on the weight of Si-titania. The resulting mixture was then disposed from the outlet side of an uncoated honeycomb flow-through cordierite monolith substrate toward the inlet side over half of the length of the substrate using the coating method described in Reference Example 3 (diameter: 26.67 cm (10.5 inches)×length: 7.62 cm (3 inches) cylindrically shaped substrate with $400/(2.54)^2$ cells per square centimeter and 0.1 millimeter (4 mil) wall thickness) to form the third coating. Afterwards, the coated substrate was dried and then calcined in an oven. The loading of the third coating after calcination was about 1 $g/in^3$, including a platinum loading in the third coating of 14 $g/ft^3$.

Second Coating (Inlet Bottom Coating):

To a Si-doped titania powder (10 wt % $SiO_2$, BET specific surface area of 200 $m^2/g$, a Dv90 of 20 microns) was added a platinum ammine solution. After calcination at 590° C. the final Pt/Si-titania had a Pt content of 0.46 weight-% based on the weight of Si-titania. This material was added to water and the slurry was milled until the resulting Dv90 was 10 microns, as described in Reference Example 1.

To an aqueous slurry of Cu-CHA zeolitic material (5.1 weight-% CuO and a $SiO_2$:$Al_2O_3$ molar ratio of 18) was added a zirconyl-acetate solution to achieve 5 weight-% $ZrO_2$ after calcination based on the weight of the zeolitic material. To this Cu-CHA slurry, the Pt-containing slurry was added and stirred, creating the final slurry. The final slurry was then disposed over half the length of the honeycomb cordierite monolith substrate, coated with the third coating, from the inlet side of the substrate towards the outlet side, ensuring that the second coating does not overlap the third coating and using the coating method described in Reference Example 3. Afterwards, the coated substrate was dried and then calcined in an oven. The loading of the second coating, after calcination, was about 2 $g/in^3$ with a Cu-CHA loading of 1.67 $g/in^3$, a $ZrO_2$ loading of 0.08 $g/in^3$, a Si-titania loading of 0.25 $g/in^3$ and a PGM loading of 2 $g/ft^3$. The weight ratio of the Si-titania to Cu-CHA is of about 0.15:1.

First Coating (Full-Length Top Coating):

To an aqueous slurry of Cu-CHA zeolitic material (5.1 weight-% CuO and a $SiO_2$:$Al_2O_3$ molar ratio of 18) was added a zirconyl-acetate solution to achieve 5 weight-% $ZrO_2$ after calcination based on the weight of the zeolitic material. The slurry was then disposed over the full length of the honeycomb cordierite monolith substrate, coated with the third and second coatings, from the inlet side of the substrate towards the outlet side and covering the second and third coatings using the coating method described in Reference Example 3. Afterwards, the coated substrate was dried and then calcined in an oven. The loading of this first coating after calcination was 1.0 $g/in^3$.

The final catalytic loading ($1^{st}$, $2^{nd}$ and $3^{rd}$ coatings) in the catalyst after calcination was about 2.5 $g/in^3$.

Example 1: Preparation of a Catalyst According to the Present Invention (with Two Coatings)

Second Coating (Outlet Bottom Coating):

An incipient wetness impregnation of Pt into a silica-doped titania powder ($TiO_2$ (90 weight-%) and 10 weight-% of $SiO_2$, having a BET specific surface area of 200 $m^2/g$, a Dv90 of 20 micrometers, and a fresh pore volume of 0.6 $cm^3/g$) was made. The Pt source was a suspension of colloidal stabilized Pt with a 2 weight-% solid content. The volume of the impregnating solution was calculated based on the mass of the titania powder and the corresponding pore volume. The Pt was then thermally fixated by powder calcining the impregnated silica-doped titania at 590° C. for 1 hour. After the thermal fixation, the impregnated silica-doped titania powder was reslurried with deionized water and tartaric acid such that the solid content of the final slurry was 40 weight-% and the pH of the aqueous phase of said slurry was 3.75. The slurry was then milled until the resulting Dv90 was 10 micrometers, determined as described in Reference Example 1.

Separately, a zeolite slurry was produced by mixing a Cu-CHA zeolite (5.1 weight-% of Cu, calculated as CuO, and a $SiO_2$:$Al_2O_3$ molar ratio of 18) with deionized water, such that the resulting slurry solid content was 38 weight-%. This Cu-CHA slurry was then added to the Pt/silica-doped titania slurry. The weight ratio of Pt/silica-doped titania to Cu-CHA was of about 4:1. Lastly, a colloidal silica binder (with a solid content of 34.5 weight-%) and deionized water were added to the slurry to bring the final slurry solid content to 38 weight-%. The resulting mixture was then disposed from the outlet side of an uncoated honeycomb flow-through cordierite monolith substrate toward the inlet side over 67% of the length of the substrate using the coating method described in Reference Example 3 (diameter: 26.67 cm (10.5 inches)×length: 7.62 cm (3 inches) cylindrically shaped substrate with $400/(2.54)^2$ cells per square centimeter and 0.1 millimeter (4 mil) wall thickness) to for the second coating. Afterwards, the coated substrate was dried and then calcined. The final loading of the second coating, after calcination, was 1.25 g/in$^3$, including 0.24 g/in$^3$ of Cu-CHA, 1 g/in$^3$ of a silica-doped titania, and 0.012 g/in$^3$ of $SiO_2$ loading (binder). The PGM loading in the second coating (coated over 67% of the substrate length) was 12 g/ft$^3$. The ratio of the first loading (Pt/silica-doped titania), in g/l, to the second loading (Cu-CHA), in g/l, L1:L2, is of about 4:1.

First Coating (Full-Length Top Coating)

An aqueous zirconyl acetate solution was diluted in water (3.1 weight % of $ZrO_2$ in water). The amount of zirconyl acetate was calculated such that the loading of zirconia (in the first coating) after calcination, calculated as $ZrO_2$, was 0.05 g/in$^3$. To this, a Cu-CHA zeolite (5.1 weight-% of Cu, calculated as CuO, and a $SiO_2$:$Al_2O_3$ molar ratio of 18) was added and mixed. The resulting slurry had a solid content of 38% by weight. This slurry was then disposed over the full length of the coated honeycomb cordierite monolith substrate, from the inlet side of the substrate towards the outlet side and covering the second coating using the coating method described in Reference Example 3. Afterwards, the coated substrate was dried and then calcined. The loading of the first coating, after calcination, was 2 g/in$^3$, including 1.95 g/in$^3$ of Cu-CHA and 0.05 g/in$^3$ of $ZrO_2$.

The final loading ($1^{st}$ and $2^{nd}$ coatings) in the catalyst after calcination was about 2.85 g/in$^3$.

Example 2: Testing of the Catalysts of Comparative Example 1 and Example 1—DeNOx Performance, $N_2O$ Formation and $NH_3$ Slip The catalysts were evaluated on a motor test cell equipped with a 6.7 L off-road calibrated engine. In all cases, each catalyst was tested alone, without any upstream oxidation or downstream SCR catalysts. The resulting space velocity was 85 k/h for the SCR test (165 k/h for the highest temperature point). The SCR test used an ammonia to NOx ratio (ANR) sweep test with different stoichiometric ratios between $NH_3$ and NOx. For the data presented in FIGS. 1-3, the NOx conversion was always provided at ANR=1.1 and the $N_2O$ formation and $NH_3$ slip were provided at ANR=1.0 (ANR, which is the stoichiometric ammonia to NOx ratio, allows one to determine the correct amount of urea to inject based on the given exhaust mass flow and NOx concentration). The catalyst of Example 1 was tested degreened, namely heated at 450° C. for 2 hours, and aged at 550° C. for 50 hours in in hydrothermal oven with 10% $H_2O$ and the catalyst of Comparative Example was tested degreened, namely heated at 450° C. for 2 hours. Five SCR inlet temperatures were chosen, and the engine conditions were set appropriately to reach the targeted space velocities. The catalyst activity was allowed to attain a steady-state equilibrium at each engine load (temperature) and ANR step before moving on to the next step. The NOx conversion, $N_2O$ formation, and $NH_3$ slip presented herein were measured on the same test.

As may be taken from FIG. 1, the two catalysts are close in deNOx performance at temperatures of about 250 to 350° C. While at higher temperatures, the catalyst of the present invention (Example 1) exhibits improved NOx conversion of up to about 10%. Without wanted to be bound to any theory, it is believed that this is due to the particular design of the inventive catalyst with a PGM outlet bottom coating and a zeolite top coating. Thus, this figure illustrates that the catalyst of the present invention permits to obtain improved deNOx performance compared to a catalyst which does not have the particular design and composition of the inventive one. Further, as may be taken from FIG. 2, the $N_2O$ formation measured for the inventive catalyst (Example 1) at high temperatures (above 350° C.) is very comparable with the $N_2O$ formation measured for the comparative catalyst while the latter exhibits lower deNOx performance. Thus, this figure illustrates that the catalyst of the present invention permits to obtain improved deNOx performance while not increasing the nitrous oxide formation compared to a catalyst which does not have the particular design and composition of the inventive one. Finally, as may be taken from FIG. 3, the $NH_3$ slip at temperatures ranging from 200 to 450° C. Without wanted to be bound to any theory, it is believed that this is due to the particular design of the inventive catalyst with a PGM outlet bottom coating and a zeolite top coating. Thus, this example demonstrates that the catalyst of the present invention which comprises two catalytic coatings permits to improve its catalytic performances compared to a catalyst comprising the same PGM loading and requiring three catalytic coatings.

Example 3: Testing of the Catalysts of Comparative Example 1 and Example 1—NO Oxidation The Catalysts were Evaluated on a Motor Test Cell Equipped with a 6.7 L Off-Road Calibrated Engine. In all cases, each catalyst was tested alone, without any upstream oxidation or downstream SCR catalysts. The resulting space velocity was 100 k/h for the NOx oxidation test. Prior to this test, the catalysts were degreened in-situ, namely heated at 450° C. for 2 hours. The catalyst of Example 1 was also tested after ageing at 500° C. for 50 hours in hydrothermal oven with 10% $H_2O$. For the NO oxidation test, the outlet exhaust temperature was increased and decreased step-wise from 200° C. to 500° C. to 200° C. in 25° C. steps while maintaining constant space velocity. Each step was held for 15 minutes to reach equilibrium catalyst conditions. NO oxidation activity is reported as the ratio of $NO_2$ to total NOx (or $NO_2$/NOx %).

As may be taken from FIG. 4, at low temperatures (from 200 to 250° C.), the NO oxidation performance of the two catalysts is very similar. However, above 250° C., the NO oxidation performance of the catalyst of the present invention (Example 1) improved over the performance of the catalyst of Comparative Example 1, not according to the present invention, eventually reaching about $5\%_{abs}$ greater $NO_2$/NOx by 350° C. Without wanting to be bound to any theory, it is believed that this would be due to the particular second coating (outlet bottom coating) of the inventive catalyst. In all cases, it is noted that the total amount of PGM (g/total volume) is identical between the catalysts of Example 1 and of Comparative Example 1. Therefore, as demonstrated by Examples 2 and 3 herein above, the catalyst of the present invention which comprises two coatings permits to exhibit great catalytic activity (ammonia oxidation, NO oxidation, NOx conversion) while reducing the nitrous oxide formation.

CITED LITERATURE

Figure 1:
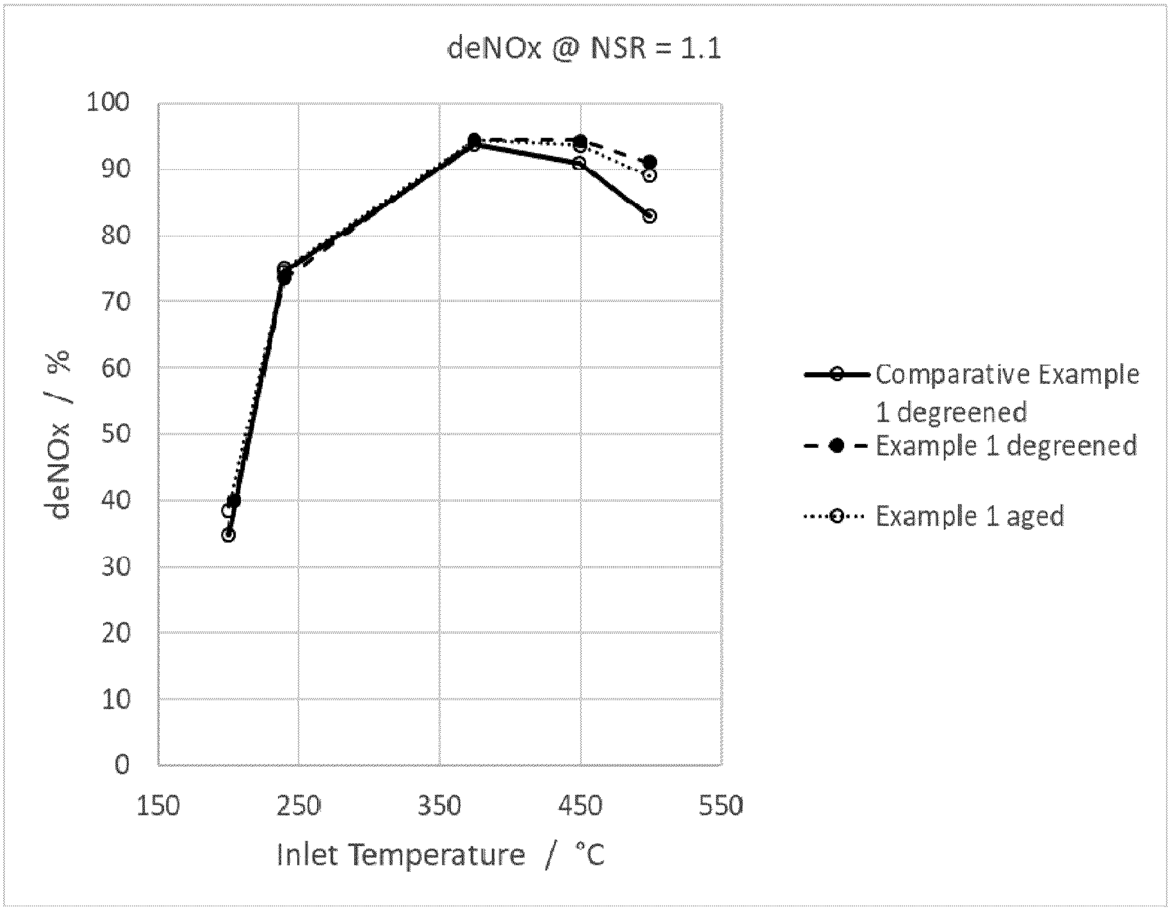
FIG. 1 shows the deNOx performance of the catalyst of Example 1 and of Comparative Example 1 at inlet temperatures ranging from 200 to 450° C. and at ANR=1.1.
Figure 2:
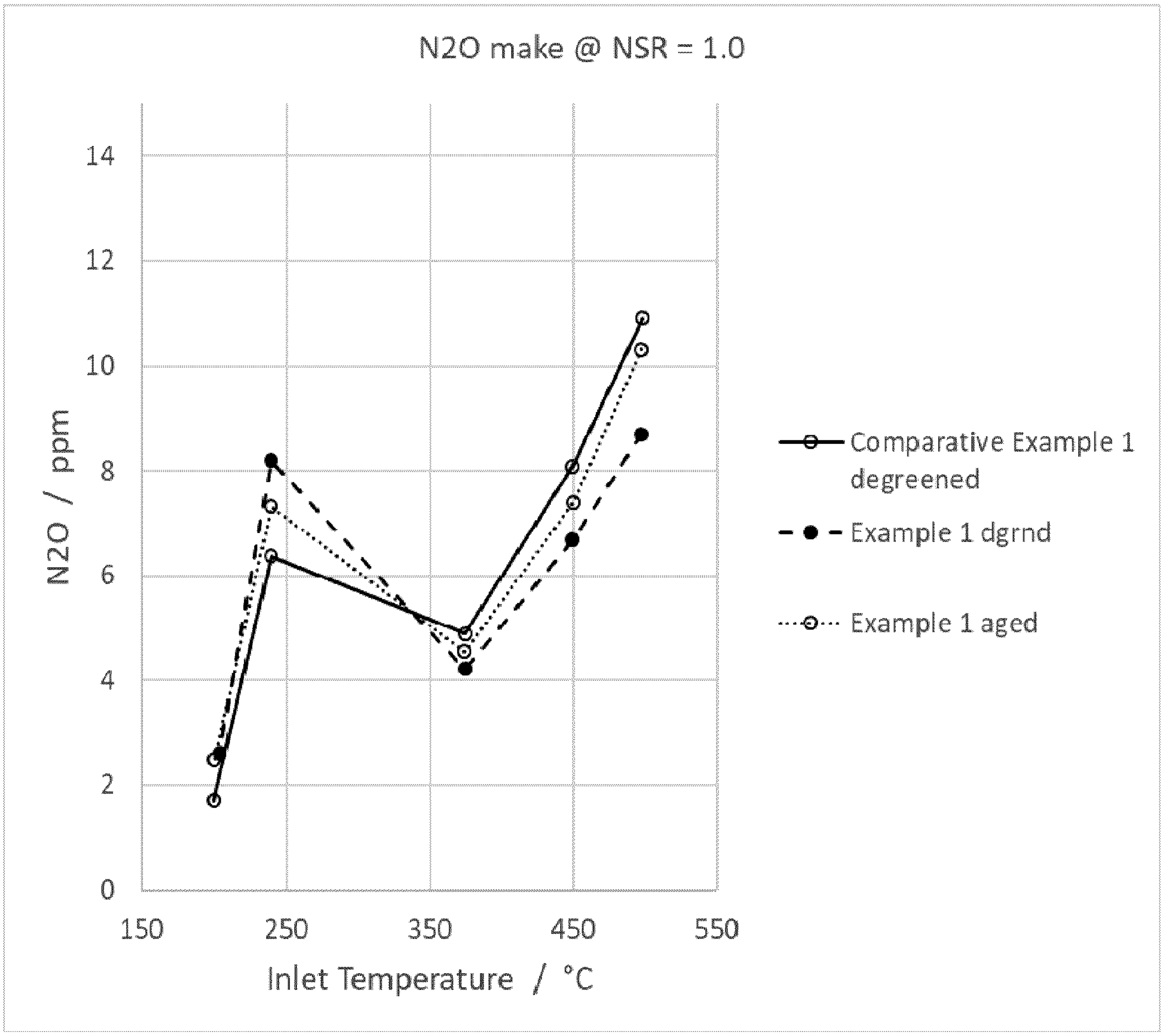
FIG. 2 shows the nitrous oxide formation measured for the catalysts of Example 1 and of Comparative Example 1 at inlet temperatures ranging from 200 to 450° C. and at ANR=1.0.
Figure 3:
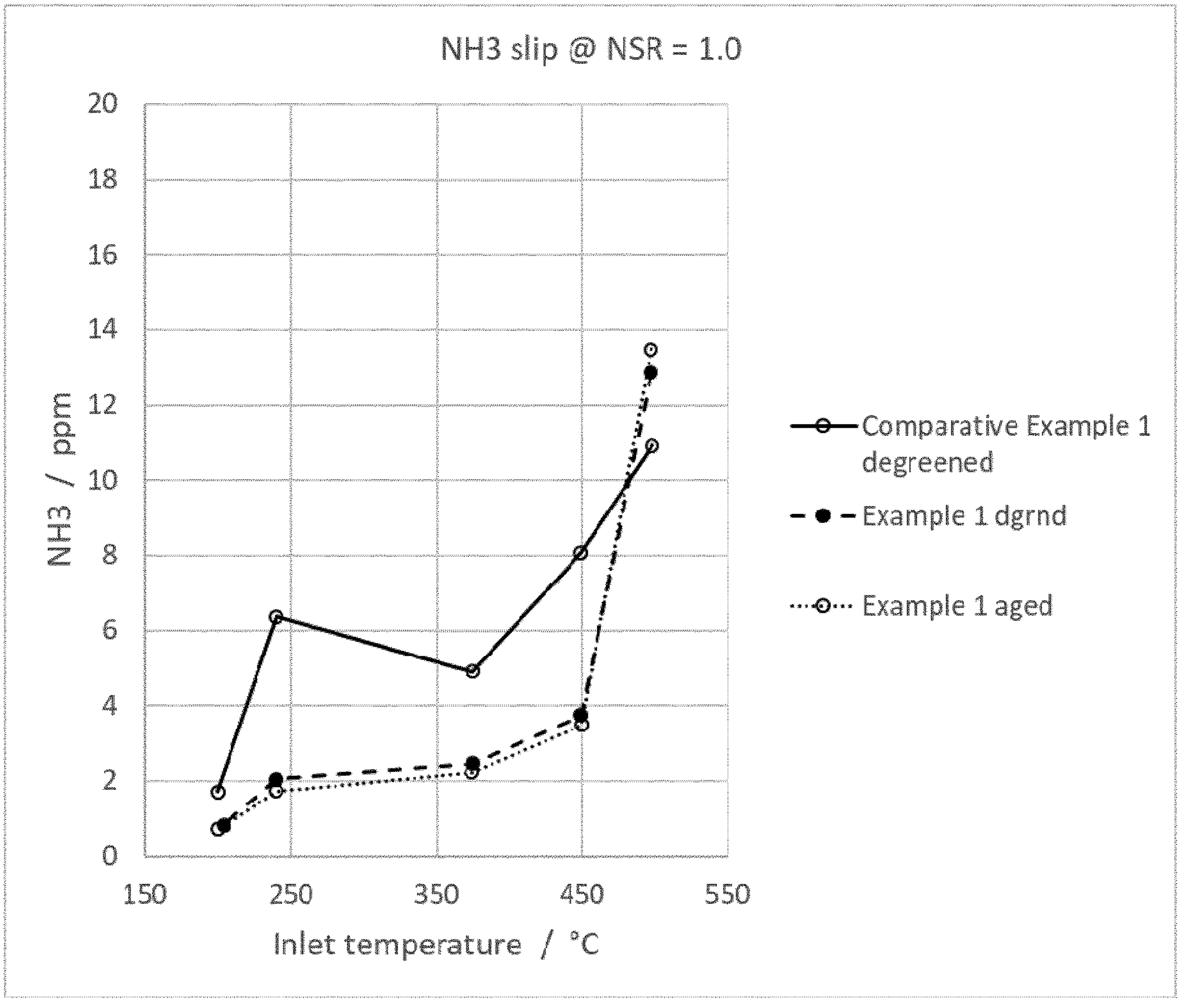
FIG. 3 shows the ammonia slip of the catalysts of Example 1 and of Comparative Example 1 at inlet temperatures ranging from 200 to 450° C.
Figure 4:
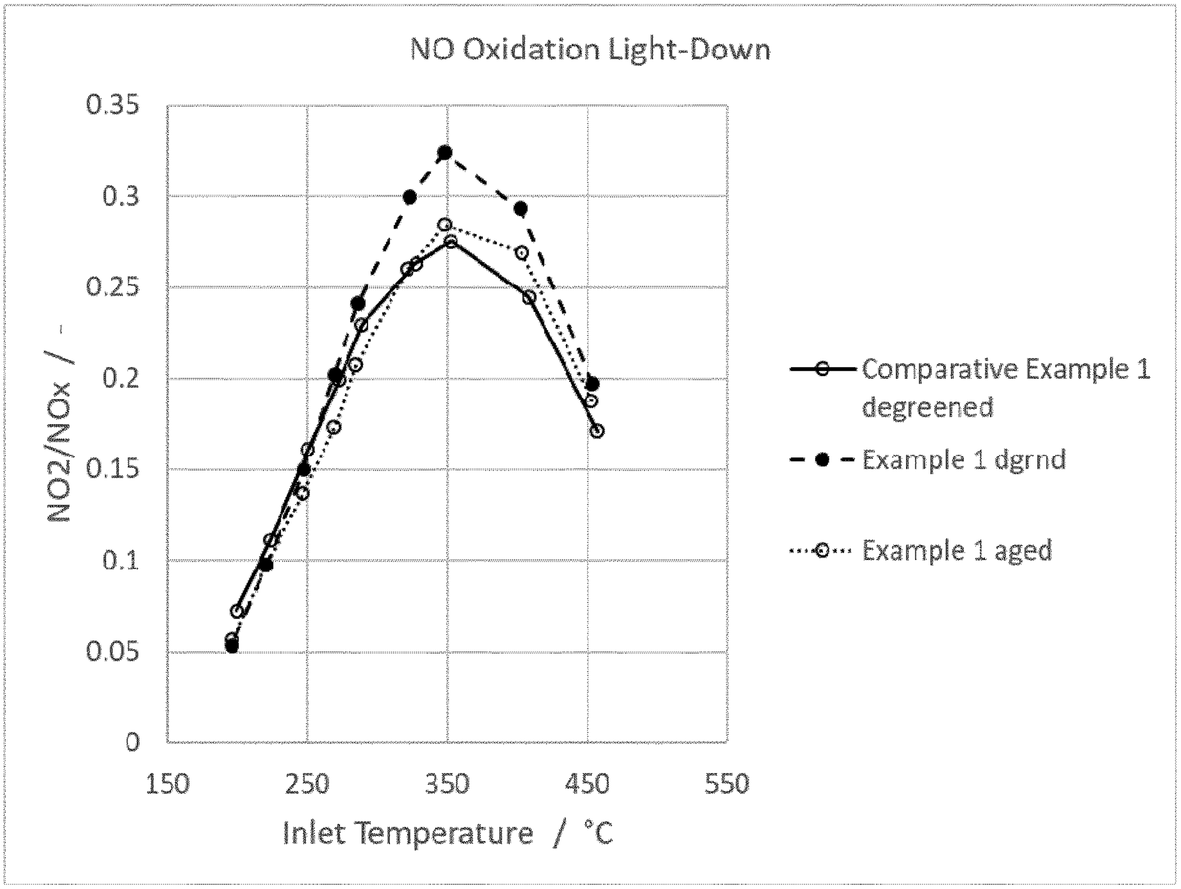
FIG. 4 shows the NO oxidation ($NO_2$/NOx ratio) of the catalysts of Example 1 and of Comparative Example 1 at inlet temperatures of from about 200 to 450° C. and a SV of 100 k/h.
Figure 5:
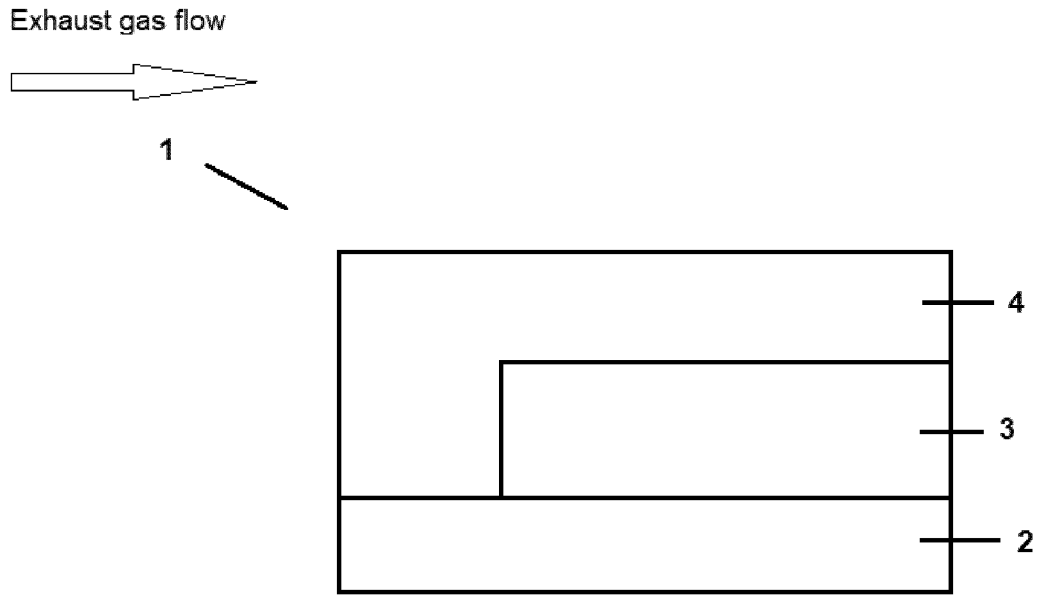
FIG. 5 shows a schematic depiction of a catalyst according to the present invention (a) and a catalyst not according to the present invention (b), the catalyst of Comparative Example 1. In particular, this figure shows (a) a catalyst 1 of the present invention comprising a substrate 2, such as a flow-through substrate, onto which an outlet coating 3, the second coating of the present invention, is disposed over 67% of the substrate axial length from the outlet end to the inlet end of the substrate. The catalyst 1 further comprises a top coating 4 disposed onto the surface of the internal walls of the substrate 2 and on the coating 3 (second coating) over the entire length of the substrate. Further, this figure shows (b) a catalyst 20 not according to the present invention comprising a substrate 2, such as a flowthrough substrate, onto which an inlet coating 5, the second coating of the catalyst of Comparative Example 1, is disposed over 50% of the substrate axial length from the inlet end to the outlet end of the substrate and an outlet coating 6, the third coating of the catalyst of Comparative Example 1, is disposed over 50% of the substrate axial length from the outlet end to the inlet end. The catalyst 20 further comprises a top coating 7 disposed onto the coating 5 and the coating 6 over the entire length of the substrate.
Figure 5:
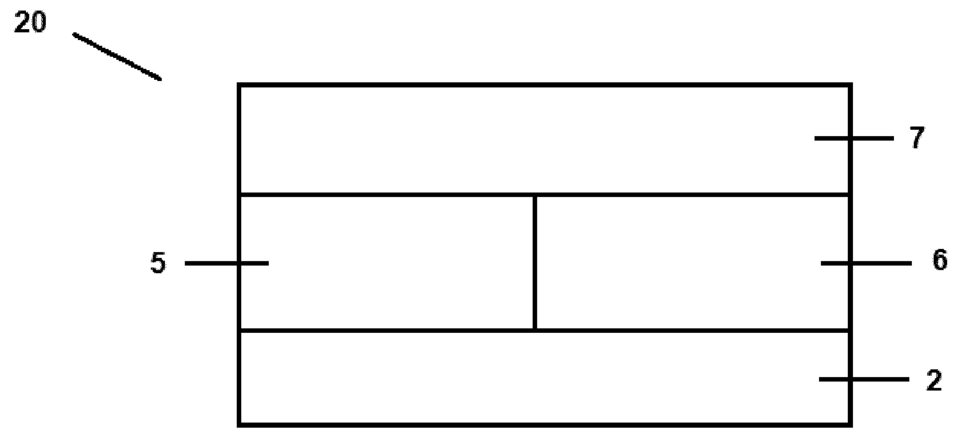

US 2018/0280876 A1
US 2018/0280877 A1

The invention claimed is:

1. A catalyst for the oxidation of NO, for the oxidation of ammonia and for the selective catalytic reduction of NOx, comprising:

(i) a substrate comprising an inlet end, an outlet end, a substrate axial length extending from the inlet end to the outlet end, and a plurality of passages defined by internal walls of the substrate extending therethrough, wherein the interface between the passages and the internal walls is defined by the surface of the internal walls;

(ii) a first coating comprising one or more of a vanadium oxide and a zeolitic material comprising one or more of copper and iron;

(iii) a second coating comprising a platinum group metal component supported on a non-zeolitic oxidic material, wherein the platinum group metal component supported on the non-zeolitic oxidic material is present in the second coating at a first loading L1, wherein the first loading is a sum of the loading of the platinum group metal component and the loading of the non-zeolitic oxidic material;

the second coating further comprising a zeolitic material comprising one or more of copper and iron, wherein the zeolitic material comprising one or more of copper and iron is present in the second coating at a second loading L2, wherein the second loading is a sum of the loading of the zeolitic material and the loading of the one or more of copper and iron;

wherein the second coating is disposed on the surface of the internal walls over y % of the axial length of the substrate from the outlet end to the inlet end, with y ranging from 60 to 90;

wherein the first coating extends over x % of the axial length of the substrate from the inlet end to the outlet end and is disposed on the second coating and on the surface of the internal walls, with x ranging from 95 to 100;

wherein the ratio of the first loading, in g/l, to the second loading, in g/l, L1:L2, is of at least 1.1:1; and wherein the platinum group metal component comprised in the second coating is one or more of platinum, palladium and rhodium; and wherein the second coating comprises the platinum group metal component at a loading, calculated as elemental platinum group metal, in the range of from 5 to 30 g/$ft^3$.

2. The catalyst of claim 1, wherein the first coating (ii) comprises a zeolitic material comprising one or more of copper and iron.

3. The catalyst of claim 1, wherein the zeolitic material comprised in the first coating has a framework type selected from the group consisting of AEI, GME, CHA, MFI, BEA, FAU, MOR, a mixture of two or more thereof, and a mixed type of two or more thereof.

4. The catalyst of claim 3, wherein the zeolitic material comprised in the second coating has a framework type selected from the group consisting of AEI, GME, CHA, MFI, BEA, FAU, MOR, a mixture of two or more thereof, and a mixed type of two or more thereof.

5. The catalyst of claim 3, wherein the zeolitic material comprised in the second coating comprises copper, wherein the amount of copper comprised in the zeolitic material, calculated as CuO, ranges from 3 weight-% to 6 weight-%, based on the total weight of the zeolitic material.

6. The catalyst of claim 3, wherein, in the second coating, the ratio of the first loading, in g/l, to the second loading, in g/l, L1:L2, ranges from 1.1:1 to 50:1.

7. The catalyst of claim 1, wherein the zeolitic material comprised in the first coating comprises copper, wherein the amount of copper comprised in the zeolitic material, calculated as CuO, ranges from 1 to 10 weight-%, based on the total weight of the zeolitic material.

8. The catalyst of claim 1, wherein from 0 weight-% to 0.001 weight-% of the first coating consist of platinum.

9. The catalyst of claim 1, wherein the non-zeolitic oxidic material onto which the platinum group metal component of the second coating is supported comprises one or more of alumina, zirconia, titania, silica, ceria.

10. The catalyst of claim 1, wherein the second coating comprises the non-zeolitic oxidic material at a loading ranging from 0.25 to 3 g/$in^3$.

* * * * *